(12) United States Patent
Banerjea et al.

(10) Patent No.: US 8,483,155 B1
(45) Date of Patent: Jul. 9, 2013

(54) USING TELEVISION WHITESPACE SPECTRUM FOR WIRELESS LOCAL AREA NETWORKS

(75) Inventors: Raja Banerjea, Sunnyvale, CA (US); Paul A. Lambert, Mountain View, CA (US)

(73) Assignee: Marvell International Ltd., Hamilton (BM)

( * ) Notice: Subject to any disclaimer, the term of this patent is extended or adjusted under 35 U.S.C. 154(b) by 453 days.

(21) Appl. No.: 12/765,106

(22) Filed: Apr. 22, 2010

Related U.S. Application Data

(60) Provisional application No. 61/176,079, filed on May 6, 2009.

(51) Int. Cl.
*H04W 4/00* (2009.01)

(52) U.S. Cl.
USPC .................................... 370/329; 455/452.1

(58) Field of Classification Search
None
See application file for complete search history.

(56) References Cited

U.S. PATENT DOCUMENTS

| | | | |
|---|---|---|---|
| 2005/0147071 A1* | 7/2005 | Karaoguz et al. | 370/338 |
| 2009/0217333 A1* | 8/2009 | Young et al. | 725/109 |
| 2010/0246506 A1* | 9/2010 | Krishnaswamy | 370/329 |
| 2011/0167291 A1* | 7/2011 | Liu et al. | 713/340 |

OTHER PUBLICATIONS

IEEE Std 802.11g/D2.8, May 2002 (Supplement to ANSI/IEEE Std 802.11-1999 Edition); Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher-Speed Physical Layer Extension in the 2.4 GHz Band; LAN/MAN Standards Committee of the IEEE Computer Society; 69 pages.

IEEE 802.11n; IEEE 802.11-04/0889r6; IEEE P802.11 Wireless LANs; TGn Sync Proposal Technical Specification; Syed Aon Mujtaba; Agere Systems Inc.; May 18, 2005; 131 pages.

IEEE Std 802.11a-1999 (Supplement to IEEE Std 802.11-1999); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-speed Physical Layer in the 5 GHz Band; LAN/MAN Standards Committee of the IEEE Computer Society; Sep. 16, 1999; 91 pages.

IEEE Std 802.11b-1999 (Supplement to ANSI/IEEE Std 802.11, 1999 Edition); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 1999; 96 pages.

(Continued)

*Primary Examiner* — Chi Pham
*Assistant Examiner* — Mohammad Adhami

(57) ABSTRACT

A client station includes a transceiver module and an association module. The transceiver module is configured to receive a beacon from an access point. The beacon includes information of a first available channel that is not assigned for licensed use in a regulated frequency spectrum and that is available for use at a location of the access point. The association module is configured to associate the client station with the access point via the first available channel in response to the client station being within range of the location of the access point.

14 Claims, 8 Drawing Sheets

OTHER PUBLICATIONS

IEEE Std 802.11e/D11.0, Oct. 2004 (Amendment to ANSI/IEEE Std 802.11-1999 (2003 Reaff) edition as amended by IEEE Std 802.11g-2003, IEEE Stad 802.11h-2003 and IEEE 802.11i-2004); IEEE Standard for Information technology—Telecommunications and information exchange between systems—Local and metropolitan area networks—Specific requirements—Part 11: Wireless LAN Medium Access Control (MAC) and Physical Layer (PHY) specifications: Amendment 7: Medium Access Control (MAC) Quality of Service (QoS) Enhancements; LAN/MAN Standards Committee of the IEEE Computer Society; 195 pages.

IEEE P802.11k/D7.0, Jan. 2007; Draft Standard for Information Technology—Telecommunications and information exchange between systems—Local and metropolitan area networks—Specific requirements—Part 11: Wireless LAN Medium Access Control (MAC) and Physical Layer (PHY) specifications: Amendment: Radio Resource Measurement; LAN/MAN Standards Committee of the IEEE Computer Society; 194 pages.

IEEE Std 802.11v/D5.0, Mar. 2009; Draft Standard for Information technology—Telecommunications and information exchange between systems—Local and metropolitan area networks—Specific requirements—Part 11: Wireless LAN Medium Access Control (MAC) and Physical Layer (PHY) specifications: Amendment 8: Wireless Network Management; 358 pages.

* cited by examiner

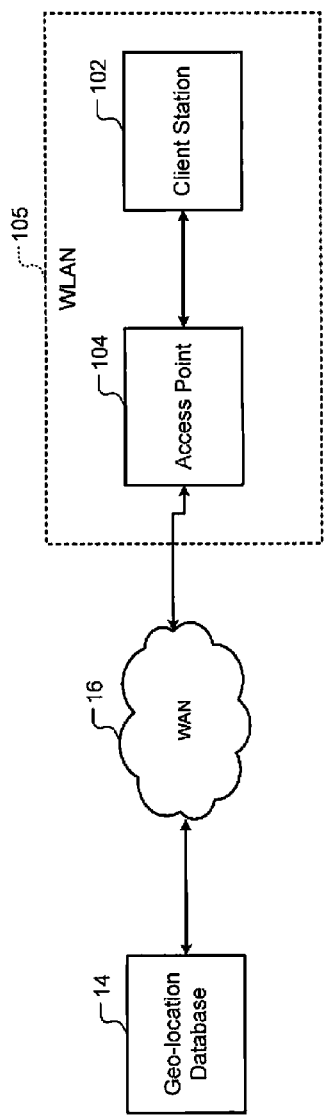
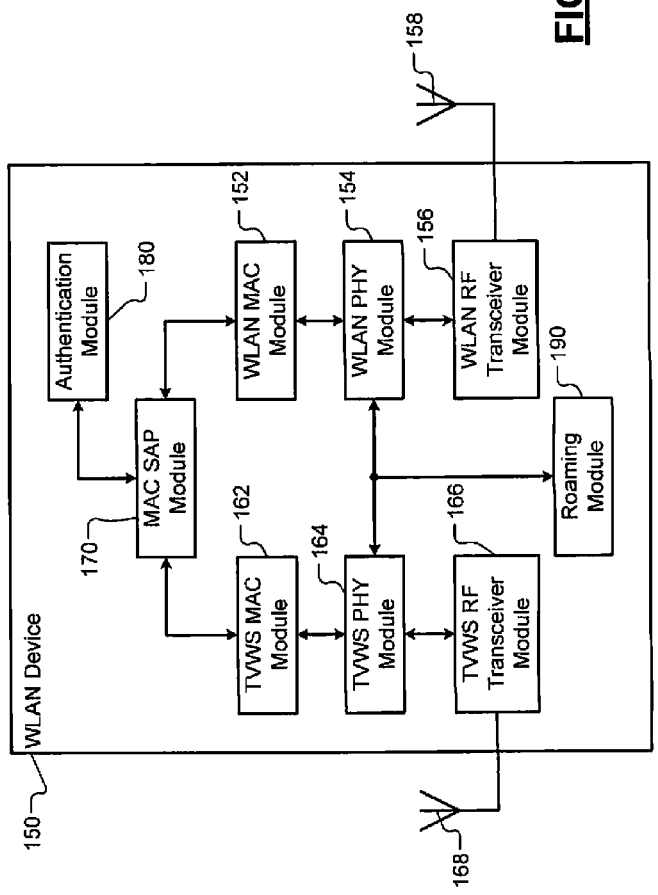

FIG. 4A

| Element ID | Length | TVWS Operation Allowed | TVWS Channel List | TWS Regulatory Capabilities |
|---|---|---|---|---|

FIG. 4B

| Element ID | Length | First Channel Number | Number of Channels |
|---|---|---|---|

FIG. 4C

| Regulatory Class | Channel Start Frequency | Channel Spacing (MHz) | Channel Set | Transmit Power Limit (dBm) | Emissions Limits Set | Behavior Limits Set |
|---|---|---|---|---|---|---|
| | | | | | | |
| | | | | | | |
| | | | | | | |

USING TELEVISION WHITESPACE SPECTRUM FOR WIRELESS LOCAL AREA NETWORKS

CROSS-REFERENCE TO RELATED APPLICATIONS

This application claims the benefit of U.S. Provisional Application No. 61/176,079, filed on May 6, 2009. The disclosure of the above application is incorporated herein by reference in its entirety.

FIELD

The present disclosure relates generally to communication systems and particularly to using television whitespace spectrum for wireless local area networks.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Digital television (TV) signals are broadcast in a 512 MHz-698 MHz frequency spectrum. The frequency spectrum is divided into multiple channels. In a given geographic location, some of the channels may be assigned to licensed TV stations for broadcasting the digital TV signals in the location. Additionally, some of the channels may be assigned to wireless microphones that are licensed for use at public events (e.g., music concerts, news reporting, etc.) in the location. Accordingly, one or more channels may be unused and may be available for unlicensed use in the location. Unused channels in the 512 MHz-698 MHz frequency spectrum are called TV White Space (TVWS) channels.

SUMMARY

A client station comprises a transceiver module and an association module. The transceiver module is configured to receive a beacon from an access point. The beacon includes information of a first available channel that is not assigned for licensed use in a regulated frequency spectrum and that is available for use at a location of the access point. The association module is configured to associate the client station with the access point via the first available channel in response to the client station being within range of the location of the access point.

In other features, the apparatuses and methods described in the present disclosure are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein:

FIG. 2 is a functional block diagram of a network that includes an access point (AP) and a client station (STA);

FIG. 3A is a functional block diagram of a wireless local area network (WLAN) device that includes separate components for WLAN channels and TVWS channels;

FIG. 4A depicts a format for transmitting information about television whitespace (TVWS) channels from an access point (AP);

FIG. 4B depicts a format for transmitting information about television whitespace (TVWS) channels from a client station (STA);

FIG. 4C depicts a table that includes regulatory class information for the television whitespace (TVWS) channels in the United States;

DESCRIPTION

Figure 1A:
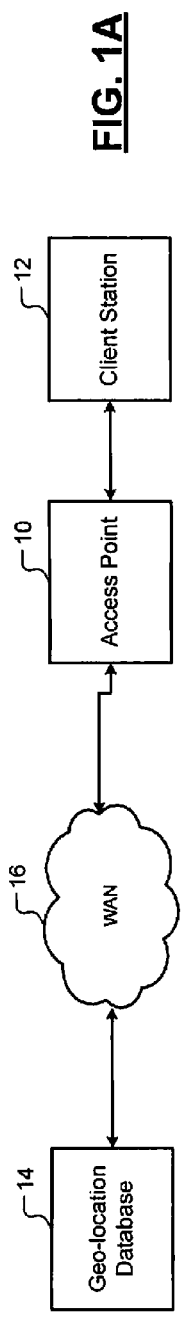
FIG. 1A is a functional block diagram of a network that includes an access point (AP) and a client station (STA)

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Unlicensed communication devices may use television White Space (TVWS) channels according to guidelines provided by the federal communications commission (FCC). Under the guidelines, a geo-location database stores a list of available TVWS channels per geographic location. Unlicensed communication devices intending to use TVWS channels in a given location must query the database and determine availability of the TVWS channels in the location. Alternatively, the unlicensed communication devices may perform spectral sensing to determine if a TVWS channel is currently unused in the location. Additionally, to avoid interference with TV transmitters that may be operating in the 512 MHz-698 MHz frequency spectrum in the location, the FCC limits the transmit power that the unlicensed communication devices can use to communicate on the TVWS channels.

Wireless local area network (WLAN) devices that comply with one or more Institute of Electrical and Electronics Engineers (IEEE) 802.11 specifications may operate in a 2.4 GHz band or a 5 GHz band. The 2.4 GHz band and the 5 GHz band are typically divided into multiple channels (WLAN channels) in which the WLAN devices may operate. The present disclosure relates to WLAN devices that can operate in the WLAN channels as well as in the (TVWS) channels.

Figure 1C:
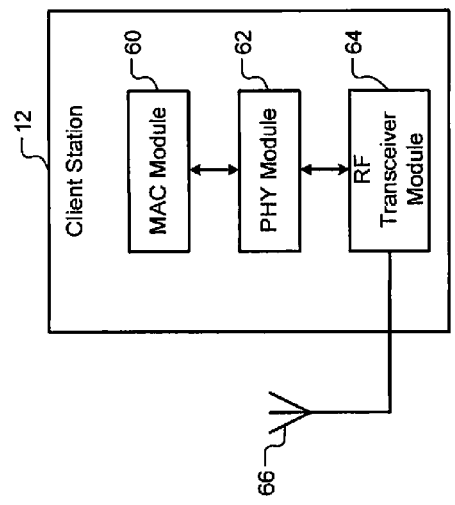
FIG. 1C is a functional block diagram of a client station (STA)
Figure 1B:
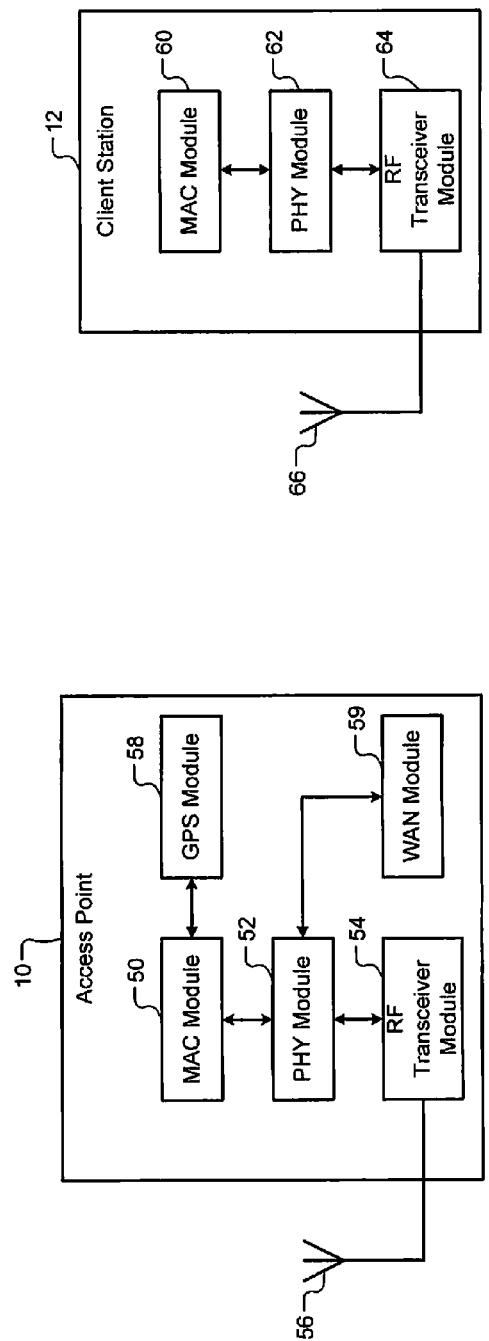
FIG. 1B is a functional block diagram of an access point (AP)

Referring now to FIGS. 1A-1C, an access point (AP) 10 and a client station (STA) 12 capable of communicating in a TVWS channel are shown. In FIG. 1A, the AP 10 and the STA 12 communicate in one or more TVWS channels. In FIG. 1B, the AP 10 includes a media access control (MAC) module 50, a physical layer (PHY) module 52, a radio frequency (RF) transceiver module 54, and an antenna 56. In FIG. 1C, the STA 12 includes a MAC module 60, a PHY module 62, a RF transceiver module 64, and an antenna 66.

In FIG. 1B, the RF transceiver module 54 and the antenna 56 can transmit and receive signals in the TVWS channels. The MAC module 50 and the PHY module 52 comply with one or more IEEE 802.11 specifications. Additionally, the MAC module 50 and the PHY module 52 allow the AP 10 to communicate with a geo-location database 14 to determine which TVWS channels are available for use where the AP 10 is located, if any. Further, the MAC module 50 and the PHY module 52 support communication in the TVWS channels.

In FIG. 1C, the RF transceiver module 64 and the antenna 66 can transmit and receive signals in the TVWS channels. The MAC module 60 and the PHY module 62 comply with one or more IEEE 802.11 specifications. Additionally, the MAC module 60 and the PHY module 62 allow the STA 12 to communicate with the database 14 to determine which TVWS channels are available for use where the STA 12 is located, if any. Further, the MAC module 60 and the PHY module 62 support communication in the TVWS channels.

In FIGS. 1B and 1C, although the AP 10 and the STA 12 are shown to include one antenna, the AP 10 and the STA 12 may each include multiple antennas. For example, the AP 10 and the STA 12 may be capable of communicating in other channels (e.g., Worldwide Interoperability for Microwave Access (WiMAX) channel). Accordingly, the AP 10 and the STA 12 may include additional antennas. Further, the RF transceiver modules 54, 64 may process signals in the TVWS channels and in the other channels.

Referring again to FIGS. 1A and 1B, the AP 10 determines a location (e.g., a geographic location) of the AP 10. The AP 10 may determine the location in many ways. For example, the AP 10 may include a global positioning satellite (GPS) module 58 that can communicate with global positioning satellites and determine the location of the AP 10. Alternatively, a user may input the location into the AP 10. The AP 10 may determine the location in other ways. For example, the AP 10 may determine the location by communicating with the STA 12 and/or from a configuration of the AP 10 maintained by an Internet service provider (ISP).

Using the location information, the AP 10 may query the geo-location database 14. For example, the AP 10 may query the database 14 via a wide area network (WAN) 16. Accordingly, the AP 10 may include a WAN interface 59 that connects the AP 10 to the WAN 16. The WAN interface 59 may include a wireline interface or a wireless interface. By querying the database 14, the AP 10 determines if a TVWS channel is available for use where the AP 10 is located. Additionally, by querying the database 14, the AP 10 determines a maximum transmit power that can be used to communicate in the TVWS channel.

If a TVWS channel is available, the AP 10 transmits beacons that include information about the TVWS channel and the maximum transmit power. For example, the information may be included in one or more information element (IE) fields of the beacons. When the STA 12 receives the beacons, the STA 12 may adjust the transmit power of the RF transceiver module 64 based on the information in the beacons. The STA 12 associates with the AP 10 and communicates with the AP 10 via the TVWS channel.

Referring now to FIG. 2, a client station (STA) 102 and an access point (AP) 104 may comply with one or more IEEE 802.11 specifications. The STA 102 and the AP 104 communicate with each other in a wireless local are network (WLAN) 105 on a WLAN channel according to the IEEE 802.11 specifications. Additionally, the STA 102 and the AP 104 can operate in the TVWS channels. Accordingly, if a TVWS channel is available for unlicensed use where the STA 102 and the AP 104 are located, the STA 102 and the AP 104 may communicate with each other on the WLAN channel and/or the TVWS channel.

More specifically, the STA 102 and the AP 104 may communicate in the WLAN channel and can switch from the WLAN channel to the TVWS channel. For example, the STA 102 and the AP 104 can switch from the WLAN channel to the TVWS channel when a distance between the AP 104 and the STA 102 increases. Conversely, the STA 102 and the AP 104 can switch from the TVWS channel to the WLAN channel when the distance between the AP 104 and the STA 102 decreases.

The AP 104 and the STA 102 can switch between the WLAN channel and the TVWS channel using roaming processes described in the IEEE 802.11 specifications. The switching between the WLAN channel and the TVWS channel is seamless (i.e., transparent to the user of the STA 102). Additionally, the AP 104 and the STA 102 can concurrently use the WLAN channel and the TVWS channel to increase throughput. For example, the AP 104 and the STA 102 may exchange audio/video data on the TVWS channel while exchanging other data on the WLAN channel.

Figures 3B, 3C:
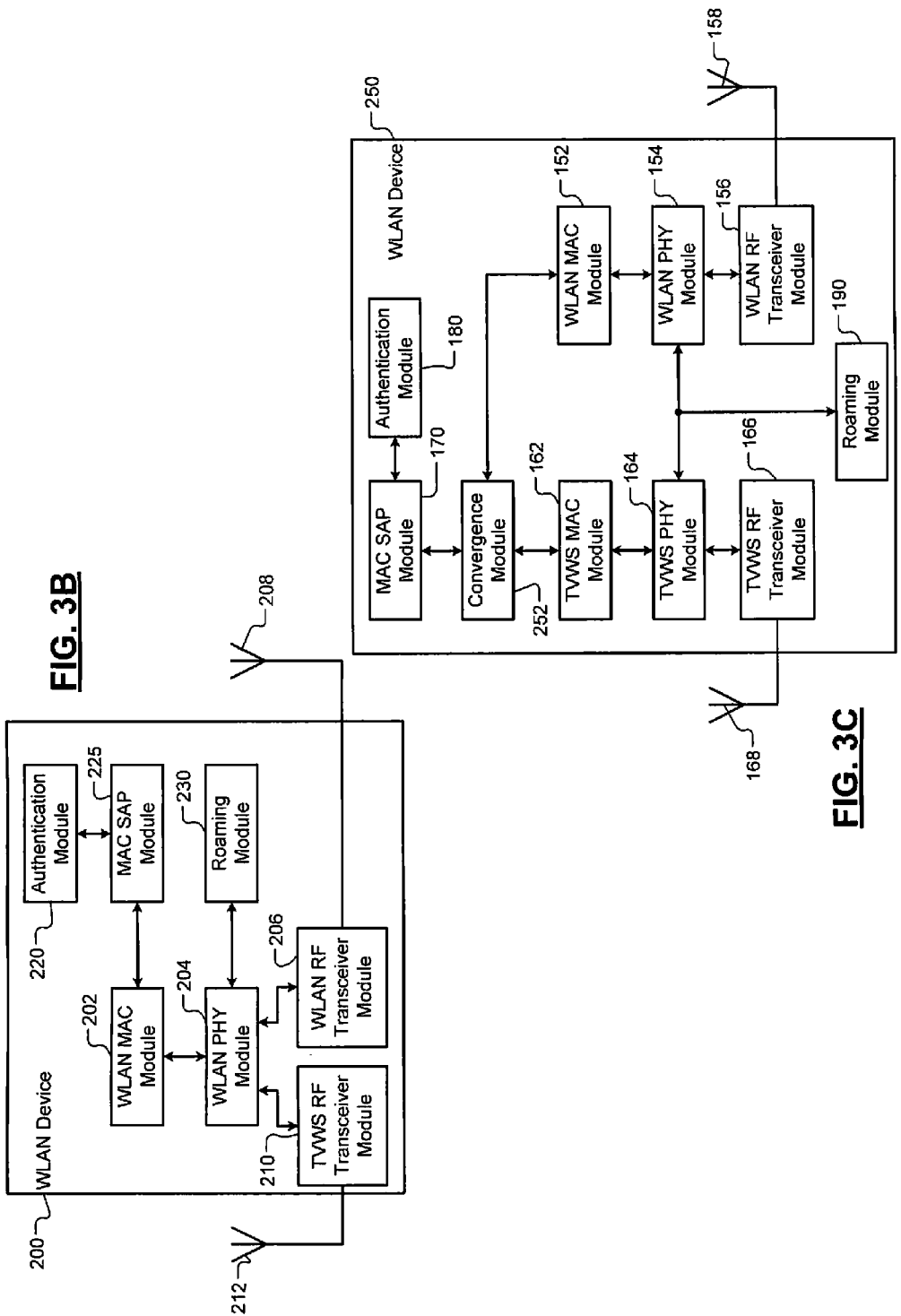
FIG. 3B is a functional block diagram of a WLAN device that includes common physical layer (PHY) and medium access control (MAC) modules for WLAN and TVWS channels.
FIG. 3C is a functional block diagram of a WLAN device that includes a convergence module for converging data on WLAN channels and TVWS channels.

Referring now to FIGS. 3A-3C, different implementations of the STA 102 and the AP 104 are shown. The STA 102 and the AP 104 are shown as WLAN devices in the implementations. Each of the WLAN devices may implement the STA 102 or the AP 104. In the WLAN devices shown, modules that are specific to the STA 102 or the AP 104 are described as such. Further, separate RF transceiver modules and antennas are used to communicate in the TVWS channels and the WLAN channels since the TVWS channels have different frequencies than the WLAN channels.

In FIG. 3A, a WLAN device 150 includes a WLAN MAC module 152, a WLAN PHY module 154, a WLAN RF transceiver module 156, and a WLAN antenna 158 (collectively WLAN components). Additionally, the WLAN device 150 includes a TVWS MAC module 162, a TVWS PHY module 164, a TVWS RF transceiver module 166, and a TVWS antenna 168 (collectively TVWS components). The WLAN MAC module 152 and the WLAN PHY module 154 comply with the IEEE 802.11 specifications. Additionally, the WLAN MAC module 152 and the WLAN PHY module 154 allow the WLAN device 150 to communicate with the database 14 to determine which TVWS channels are available for use where the WLAN device 150 is located, if any. The TVWS MAC module 162 and the TVWS PHY module 164 are similar to the WLAN MAC module 152 and the WLAN PHY module 154, respectively. Additionally, the TVWS MAC module 162 and the TVWS PHY module 164 support communication in the TVWS channels.

Further, the WLAN device 150 includes a MAC layer service access point (MAC SAP) module 170 and an authentication module 180. The MAC SAP module 170 coordinates communication of the WLAN device 150 via the WLAN MAC module 152 and/or the TVWS MAC module 162 according to the IEEE 802.11 specifications depending on the channel used for communication. The MAC SAP module 170 forwards data to be transmitted from the WLAN device 150 to the WLAN MAC module 152 and/or the TVWS MAC module 162. The MAC SAP module 170 forwards data received from the WLAN MAC module 152 and/or the TVWS MAC module 162 to processing modules of the WLAN device 150 for further processing. The authentication module 180 authenticates and secures communications in the WLAN channels and the TVWS channels using processes similar to those described in the IEEE 802.11 specifications.

When the WLAN device 150 implements the STA 102, the WLAN device 150 also includes a roaming module 190. The roaming module 190 controls switching between the WLAN channel and the TVWS channel using processes similar to those described in the IEEE 802.11 specifications.

In FIG. 3B, a WLAN device 200 includes a WLAN MAC module 202, a WLAN PHY module 204, a WLAN RF transceiver module 206, a WLAN antenna 208, a TVWS RF transceiver module 210, and a TVWS antenna 212. The WLAN MAC module 202 and the WLAN PHY module 204 comply with the IEEE 802.11 specifications. Additionally, the WLAN MAC module 202 and the WLAN PHY module 204 allow the WLAN device 200 to communicate with the database 14 to determine which TVWS channels are available for use where the WLAN device 200 is located, if any. Further, the WLAN MAC module 202 and the WLAN PHY module 204 support communication in the TVWS channels. Accordingly, the WLAN MAC module 202 and the WLAN PHY module 204 can communicate in the WLAN channels as well as in the TVWS channels. Additionally, the WLAN device 200 includes a MAC SAP module 225, an authentication module 220, and a roaming module 230 that are similar to the MAC SAP module 170, the authentication module 180, and the roaming module 190 of the WLAN device 150, respectively.

In FIG. 3C, a WLAN device 250 includes all the modules of the WLAN device 150 and additionally includes a convergence module 252. The convergence module 252 allows the WLAN device 250 to concurrently communicate on a WLAN channel and a TVWS channel. For example, the convergence module 252 may allow the WLAN device 250 to communicate audio/video data on the TVWS channel while the WLAN device 250 communicates other data on the WLAN channel.

The convergence module 252 may use different criteria to determine when to use the TVWS channel and the WLAN channel concurrently. For example, the criteria may include load on the AP 104 and throughput (quality of service) requirement of the STA 102. The criteria may also include state of connection of the WLAN device 250 on the WLAN channel and the TVWS channel. For example, the state of a connection may include signal strength, signal to noise ratio (SNR), error rate, congestion, etc. on the connection.

During concurrent use of the TVWS channel and the WLAN channel, when the WLAN device 250 transmits data, the convergence module 252 may separate audio/video data transmitted by the WLAN device 250 from the other data transmitted by the WLAN device 250. The convergence module 252 may route the audio/video data through the TVWS components of the WLAN device 250. The convergence module 252 may route the other data through the WLAN components of the WLAN device 250.

Conversely, when the WLAN device 250 receives data, the convergence module 252 may receive audio/video data through the TVWS components and other data through the WLAN components. The convergence module 252 combines the audio/video data received from the TVWS components and the other data received from the WLAN components for further processing by the WLAN device 250.

Referring again to FIG. 2, the STA 102 and/or the AP 104 communicate with the database 14 to determine if a TVWS channel is available as follows. The database 14 maintains a list of TV stations and licensed wireless microphones operating per geographic location. The database 14 also maintains a list of unused TVWS channels available for unlicensed use per location.

The STA 102 may transmit its location (e.g., GPS coordinates) to the database 14 and obtain a list of unused TVWS channels in the location from the database 14. Additionally, the STA 102 can obtain a maximum transmit power that can be used to operate in a TVWS channel. Based on the information obtained from the database 14, the STA 102 can determine if a TVWS channel is available. Further, if a TVWS channel is available, the STA 102 can limit the transmit power to less than or equal to the maximum transmit power when using the TVWS channel. To ensure authenticity of the database 14, a security mechanism including a public-private key may be used between the STA 102 and the database 14.

Alternatively, the STA 102 can obtain the information via the AP 104. The AP 104 can act as a proxy and query the database 14 to determine if a TVWS channel is available for use in the location. The AP 104 can obtain its location (e.g., GPS co-ordinates) through a GPS service, from configuration data maintained by an ISP or a user, or from a STA having GPS capability.

The AP 104 can communicate with the database 14 via a WAN 108. The AP 104 can transmit its location to the database 14 via the WAN 108 and obtain a list of TVWS channels available for use in the location. Additionally, the AP can obtain the maximum transmit power that can be used to communicate in the TVWS channel. The AP 104 can store the list of unused TVWS channels and the maximum transmit power.

When the STA 102 associates with the AP 104 via the WLAN 105, the STA 102 can access the list stored in the AP 104 instead of querying the database 14. By accessing the list stored in the AP 104, the STA 102 can determine if a TVWS channel is available. Since the STA 102 does not query the database 14, the STA 102 need not include public certificates that are otherwise required for security and authenticity when communicating with the database 14.

Alternatively, the AP 104 can broadcast the list and the transmit power via broadcast messages (e.g., beacons) over the WLAN channel. For example, the AP 104 can transmit the list and the transmit power to STAs including the STA 102 in a WLAN basic service set (BSS). Alternatively, the AP 104 may determine communication capabilities of the STAs in the WLAN BSS. The capabilities may include ability to communicate in TVWS channels, transmit power, and so on. On determining the capabilities, the AP 104 may transmit the list and the transmit power to only those STAs that can communicate via the TVWS channels.

Typically, the AP 104 transmits the list and the transmit power via information elements (IEs) in beacon frames. The STA 102 operating in the WLAN 105 using the WLAN channel (i.e., the STA 102 operating in the WLAN BSS) can receive the beacons. The STA 102 can use the information in the beacons to determine if a TVWS channel is available and the transmit power to use when using the TVWS channel.

In some implementations, when the STA 102 associates with the AP 104 via the WLAN 105, the AP 104 can determine the location of the STA 102 using time of arrival (TOA) estimation or location management messages described in the IEEE 802.11 specifications. Additionally, the AP 104 can determine the capabilities of the STA 102 via management frames (e.g., association request frames) exchanged with the STA 102 during association.

Based on the location and the capabilities of the STA 102, the AP 104 can determine if the STA 102 can operate in the TVWS channel that is available for use where the AP 104 is located. If the STA 102 can operate in the TVWS channel, the AP 104 may provide the information obtained from the database 14 to the STA 102. The AP 104 may exchange the information via management frames (e.g., association response frames) exchanged with the STA 102. The AP 104 may transmit the information in information elements (IEs) in the management frames exchanged with the STA 102.

In other implementations, when the AP 104 determines that a TVWS channel is available for use, the AP 104 may start a basic service set (BSS) in the TVWS channel. The basic service set in the TVWS channel (called TVWS BSS) may be in addition to a basic service set maintained by the AP 104 for the WLAN 105 (called WLAN BSS). The AP 104 may transmit beacons in the TVWS basic service set. The beacons may include information about the TVWS channel available for use and associated transmit power.

The STA 102, which typically scans the WLAN channels for a WLAN basic service set, may also scan the TVWS channels for a TVWS basic service set. When scanning the TVWS channels, the STA 102 limits the transmit power to a maximum transmit power prescribed by the FCC for scanning purposes. When the STA 102 receives beacons from the AP 104 in the TVWS basic service set, the STA 102 can associate with the AP 104 via the TVWS channel, adjust transmit power of the STA 102, and communicate with the AP 104 in the TVWS basic service set.

Occasionally, the STA 102 connected to the AP 104 on the WLAN channel may roam away from the AP 104. As the distance between the STA 102 and the AP 104 increases, the STA 102 can maintain the connection with the AP 104 by switching from the WLAN channel to the TVWS channel. The connection can be maintained because signals in the TVWS channels (TVWS signals) have longer wavelengths than the signals in the WLAN channels (WLAN signals). Consequently, the TVWS signals can be received at longer distances than the WLAN signals. In other words, TVWS transmissions have greater range than WLAN transmissions.

At times, however, the STA 102 may roam into a different geographic location than where the AP 104 is located. The AP 104 tracks the location of the STA 102. For example, the STA 102 may be initially associated with the AP 104 on a WLAN channel. As the STA 102 roams away from the AP 104, the STA 102 may connect to the AP 104 on the TVWS channel available at the location of the AP 104. As the STA 102 moves further away from the AP 104, the STA 102 may be in a different location than the AP 104. The TVWS channel currently used may not be available in the different location.

The STA 102 can connect to a different TVWS channel, if available, where the STA 102 is currently located. The STA 102 can determine which TVWS channel, if any, is available at its current location as follows. The AP 104 may determine the distance of the STA 102 from the AP 104 based on time of arrival (TOA) estimation. Knowing where the AP 104 is located (i.e., its own location) and the distance, the AP 104 can determine the location of the STA 102. The AP 104 can also determine the location of the STA 102 based on location management frames exchanged with the STA 102. Alternatively, the STA 102 can use an internal GPS to determine its current location and transmit its current location to the AP 104.

The AP 104 queries the database 14 to determine if a TVWS channel is available for use in the current location of the STA 102. The AP 104 transmits the information to the STA 102. Alternatively, the STA 102 may directly query the database 14 using its current location and obtain the information. Accordingly, the STA 102 can switch to a different TVWS channel that is available in its current location. The STA 102 can then locate another AP that uses the different TVWS channel and can associate with the other AP.

In summary, the AP 104 can determine a relative location of the STA 102 or an actual location of the STA 102 using any of the following methods: 1. The AP 104 can determine the location of the STA 102 using a location civic request defined in the IEEE 802.11 specifications. 2. The AP 104 can determine the location of the STA 102 using a location identifier request defined in the IEEE 802.11 specifications. 3. The AP 104 can determine the location of the STA 102 using a location configuration request and response frames described in the IEEE 802.11 specifications. 4. The AP 104 can determine the location of the STA 102 using timing measurement frames described in the IEEE 802.11 specifications.

Referring now to FIGS. 4A-4C, details of transmitting information retrieved from the database 14 (called TVWS support indication) from the AP 104 and the STA 102 are shown. In FIG. 4A, the details of transmitting the TVWS support indication from the AP 104, including a TVWS parameter set, are shown. In FIG. 4B, the details of transmitting the TVWS support indication from the STA 102 are shown. In FIG. 4C, a table containing regulatory class information for the TVWS channels in the United States is shown. The table may be stored in the database 14.

In FIGS. 4A and 4B, since the range of an AP capable of communicating in TVWS channels is wide (about 1-3 Kilometers), the AP 104 and the STA 102 can query the database 14 using their location to determine if they can transmit data in a TVWS channel. For example, during booting, the AP 104 can obtain its location through GPS or other means. After querying the database 14, the AP 104 can indicate in a beacon frame if the AP 104 is capable of operating in one or more TVWS channels. Additionally, the AP 104 can include in the beacon frame a list of TVWS channels received from the database 14 in which the AP 104 can operate and the TVWS regulatory capabilities.

In FIG. 4A, the AP 104 can include the information received from the database 14 in an information element of the beacon frame in a format shown. For example, the information element can include an element identifier (ID), a length of the information element, and a TVWS parameter set. The TVWS parameter set includes indications of whether TVWS operation is allowed where the AP 104 is located, a list of TVWS channels in which the AP 104 can operate, and TVWS regulatory capabilities.

More specifically, the "TVWS Operation Allowed" parameter indicates if the AP 104 is capable o operating in a TVWS channel and is allowed to operate in the TVWS channel. The "TVWS Channel List" parameter identifies the channels in which the AP 104 is allowed to transmit. Each channel has a width of approximately 6 MHz. If the AP 104 currently maintains a TVWS BSS, the TVWS channel list may include a single channel in which the AP 104 currently maintains the TVWS BSS. The "TVWS Regulator Capabilities" parameter identifies regulatory requirements including limits on transmit power, number of channels, etc.

In FIG. 4B, the STA 102 may indicate support for operating in a TVWS channel during association exchange sequence with the AP 104 as follows. During association, the STA 102 indicates the supported channels through a "Supported Channels" element in an association request frame. As shown, the Supported Channels element includes an element identifier (ID), a length of the element, a first channel number, and a number of channels. A valid set of operating channels are defined in the IEEE 802.11 specifications.

In FIG. 4C, for TVWS operation, a regulatory class, the first channel number, and the number of channels can be obtained from the table shown. Additionally, for each regulatory class, the table provides information relating to channel spacing, a channel set, transmit power limit in dBm, an emissions limits set to avoid interference, and a behavior limits set. The AP 104 and/or the STA 102 can use the information to dynamically adjust their operations on the TVWS channel. Similar regulatory class information can be obtained for locations outside the United States (e.g., Europe and Japan). A regulatory domain of operation can be identified based on information contained in a Country Information Element, which is defined in the IEEE 802.11 specifications.

In some applications, the TVWS channels can be used for multicast transmissions (e.g., video broadcasting or advertising). In multicast transmissions, the AP 104 is the only device that transmits data. Accordingly, the AP 104 may disable transmission capabilities of the STAs (e.g., the STA 102) that are associated with the AP 104 and may set the STAs to operate only in receive mode.

More specifically, the AP 104 determines whether the STAs associated with the AP 104 via a WLAN channel can communicate in a TVWS channel. Then the AP 104 queries the database 14 and identifies which TVWS channel is available where the AP 104 and the STAs are located. The AP 104 transmits the information received from the database 14 to the STAs via the TVWS parameter set. Additionally, the AP 104 transmits configuration information that configures the STAs to operate only in receive mode and to not transmit data in the TVWS channel. Accordingly, the STAs can receive multicast transmissions from the AP 104 in the TVWS channel.

For example, the AP 104 may transmit the configuration information that disables transmission of the STA 102 and that sets the STA 102 to receive mode via information elements in the beacon frames or other frames. The configuration information may be included in the information elements that include the TVWS parameter set. On receiving the configuration information, the STA 102 may disable (e.g., shut down or set to a low power mode) the transmit portions of the TVWS components of the STA 102.

Figure 5:
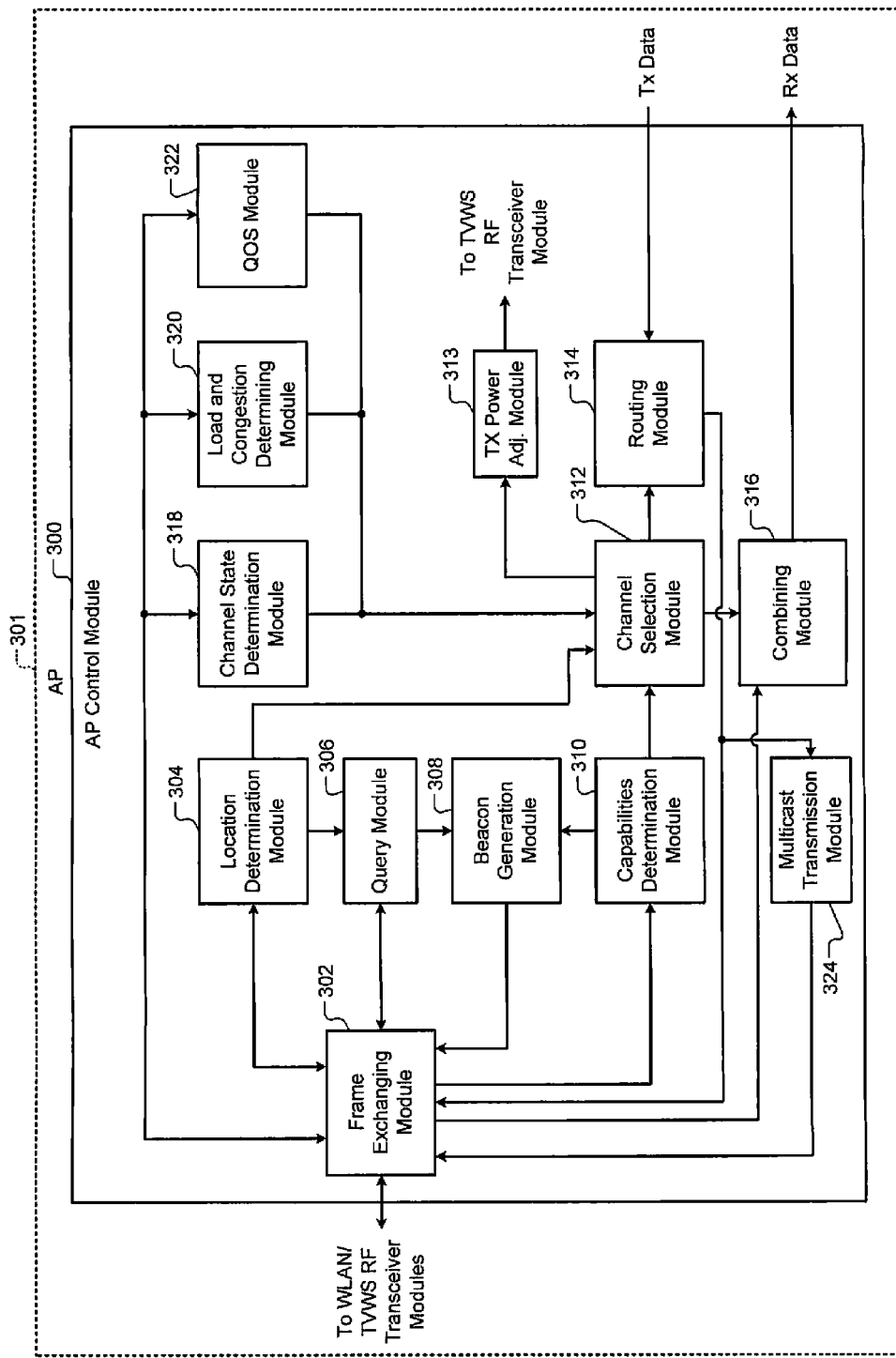
FIG. 5 is functional block diagram of an access point (AP) control module.

Referring now to FIG. 5, an AP control module 300 that can be implemented in an AP 301 is shown. For example, the AP control module 300 can be implemented in the AP 10 shown in FIG. 1B or the AP 104 shown in FIG. 2. Additionally, the AP control module 300 can be implemented in the WLAN devices 150, 200, 250 of FIGS. 3A-3C when the WLAN devices 150, 200, 250 operate as APs. The AP control module 300 performs functions of one or more modules of the AP 10, the AP 104, and the WLAN devices 150, 200, 250. Accordingly, the AP control module 300 may be implemented in one or more modules of the AP 10, the AP 104, and the WLAN devices 150, 200, 250.

The AP control module 300 includes a frame exchanging module 302, a location determination module 304, a query module 306, a beacon generation module 308, a capabilities determination module 310, a channel selection module 312, a transmit power adjustment module 313, a routing module 314, and a combining module 316. Additionally, the AP control module 300 includes a channel state determination module 318, a load and congestion determining module 320, a QOS module 322, and a multicast transmission module 324.

The frame exchanging module 302 communicates with WLAN components and/or TVWS components of the AP 301. The WLAN components of the AP 301 include a WLAN MAC module, a WLAN PHY module, and a WLAN RF transceiver module of the AP 301 (not shown) that are similar to corresponding modules shown in FIGS. 3A-3C. The TVWS components of the AP 301 include a TVWS MAC module, a TVWS PHY module, and the TVWS RF transceiver module of the AP 301 (not shown) that are similar to corresponding modules shown in FIGS. 3A-3C. The frame exchanging module 302 transmits/receives frames (or packets of data) to/from the STA via the WLAN RF transceiver module and/or the TVWS RF transceiver module of the AP 301, which are similar to corresponding modules shown in FIGS. 3A-3C.

The location determination module 304 determines the location of the AP 301 and a STA (not shown) as described above with reference to FIGS. 2-3C. Additionally, the location determination module 304 tracks the STA when the STA roams, estimates a distance of the STA from the AP, and estimates the current location of the STA as described above with reference to FIGS. 2-3C.

The query module 306 queries the database 14. The query module 306 transmits the location of the AP 301 and/or a STA associated with the AP 301 to the database 14. The query module 306 receives a list of available TVWS channels and the transmit power to be used from the database 14. The query module 306 stores the information.

The beacon generation module 308 generates beacons transmitted by the AP 301. The beacon generation module 308 includes the information of available TVWS channels and the transmit power in the beacon frames transmitted by the AP 301 as shown in FIG. 4A. The frame exchanging module 302 transmits the beacons to the STA.

The capabilities determination module 310 determines capabilities of the STA based on frames exchanged with the STA by the AP 301. The capabilities determination module 310 receives the frames exchanged with the STA from the frame exchanging module 302. For example, during association, the STA may transmit information obtained from the database 14 to the AP 301 via association frames. The association frames may include the information in a format shown in FIG. 4B. The AP 301 may use the information to determine the capabilities of the STA. Based on the capabilities of the STA and the information received by the query module 306, the beacon generation module 308 generates beacons that can inform the STA of the available TVWS channels, transmit power to use, and so on.

The channel selection module 312 selects the WLAN channels and/or the TVWS channels for communicating with the STA. The channel selection module 312 uses the criteria described above with reference to FIGS. 2-3C to select the channels. Additionally, when the TVWS channel is selected, the transmit power adjustment module 313 may adjust the transmit power of the TVWS RF transceiver module of the AP 301 according to the maximum transmit power received from the database 14. The routing module 314 routes data to be transmitted from the AP 301 to the WLAN components and/or the TVWS components of the AP 301 depending on which channel or channels are selected.

Occasionally, the channel selection module 312 may select both the WLAN channel and the TVWS channel for concurrent use. The channel selection module 312 may select both channels depending on the states of the WLAN and TVWS channels, the load and congestion at the AP 301, the QOS requested by the STA, and the distance of the STA from the AP 301. For example, both the WLAN channel and the TVWS channel may be selected when the STA is proximate to the AP 301 while only the TVWS channel may be used when the STA is far from the AP 301.

The location determination module 304 provides the distance of the STA from the AP 301 to the channel selection module 312. The channel state determination module 318 analyses the frames being transmitted and received by the frame exchanging module 302. Based on the analysis, the channel state determination module 318 senses the state of the channel used (e.g., signal strength, error rate, etc. on the WLAN/TVWS channels) and outputs the state to the channel selection module 312.

The load and congestion determining module 320 determines the load on the AP 301 and the congestion at the AP 301 by monitoring frames transmitted and received by the frame exchanging module 302. The QOS module 322 determines the QOS requested by the STA from the frames received from the STA via the frame exchanging module 302. The QOS module 322 outputs the QOS requested by the STA to the channel selection module 312.

Thus, the channel selection module 312 receives inputs from the location determination module 304, the channel state determination module 318, load and congestion determining module 320, and/or the QOS module 322. Based on the inputs received, the channel selection module 312 determines when to concurrently use the WLAN channel and the TVWS channel.

When the WLAN channel and the TVWS channel are used concurrently, the routing module 314 routes a first portion of the transmit data (Tx data) to the WLAN components of the AP 301. The routing module 314 routes a second portion of the Tx data to the TVWS components of the AP 301. The WLAN components and the TVWS components of the AP 301 transmit the first and second portions of the Tx data to the STA via respective RF transceiver modules of the AP 301.

Additionally, the WLAN components and the TVWS components of the AP 301 receive first and second portions of the receive data (Rx data) from the STA via the respective RF transceiver modules of the AP 301. The combining module 316 receives the first and second portions of the Rx data from the frame exchanging module 302. The combining module 316 combines the first and second portions of the Rx data received from the frame exchanging module 302 and outputs the combined receive data to processing modules (not shown) of the AP 301 for further processing.

Occasionally, the AP 301 may select multicast transmissions in the TVWS channel. When the AP 301 selects multicast transmissions, the multicast transmission module 324 generates and transmits configuration information that configures STAs in a basic service set to operate only in receive mode. Specifically, the configuration information disables the STAs from transmitting data in the TVWS channel. Accordingly, the STAs can only receive multicast transmissions from the AP 301 in the TVWS channel.

For example, the multicast transmission module 324 transmits the configuration information via information elements in the beacon frames or other frames. For example, the configuration information may be included in the information elements that include the TVWS parameter set. When the STAs receive the configuration information, the STAs disable transmit portions of the TVWS components of the STAs and set the STAs to receive mode in the TVWS channel. After transmitting the configuration information, the multicast transmission module 324 receives the multicast data from the routing module 314 and transmits the multicast data to the STAs.

Eventually, the AP 301 may stop the multicast transmissions. When the AP 301 stops the multicast transmissions, the multicast transmission module 324 transmits configuration information that enables transmissions from the STAs in the TVWS channel. On receiving the configuration information, the STAs may enable the transmit portions of the TVWS components of the STAs and may begin transmissions via the TVWS channel.

Figure 6:
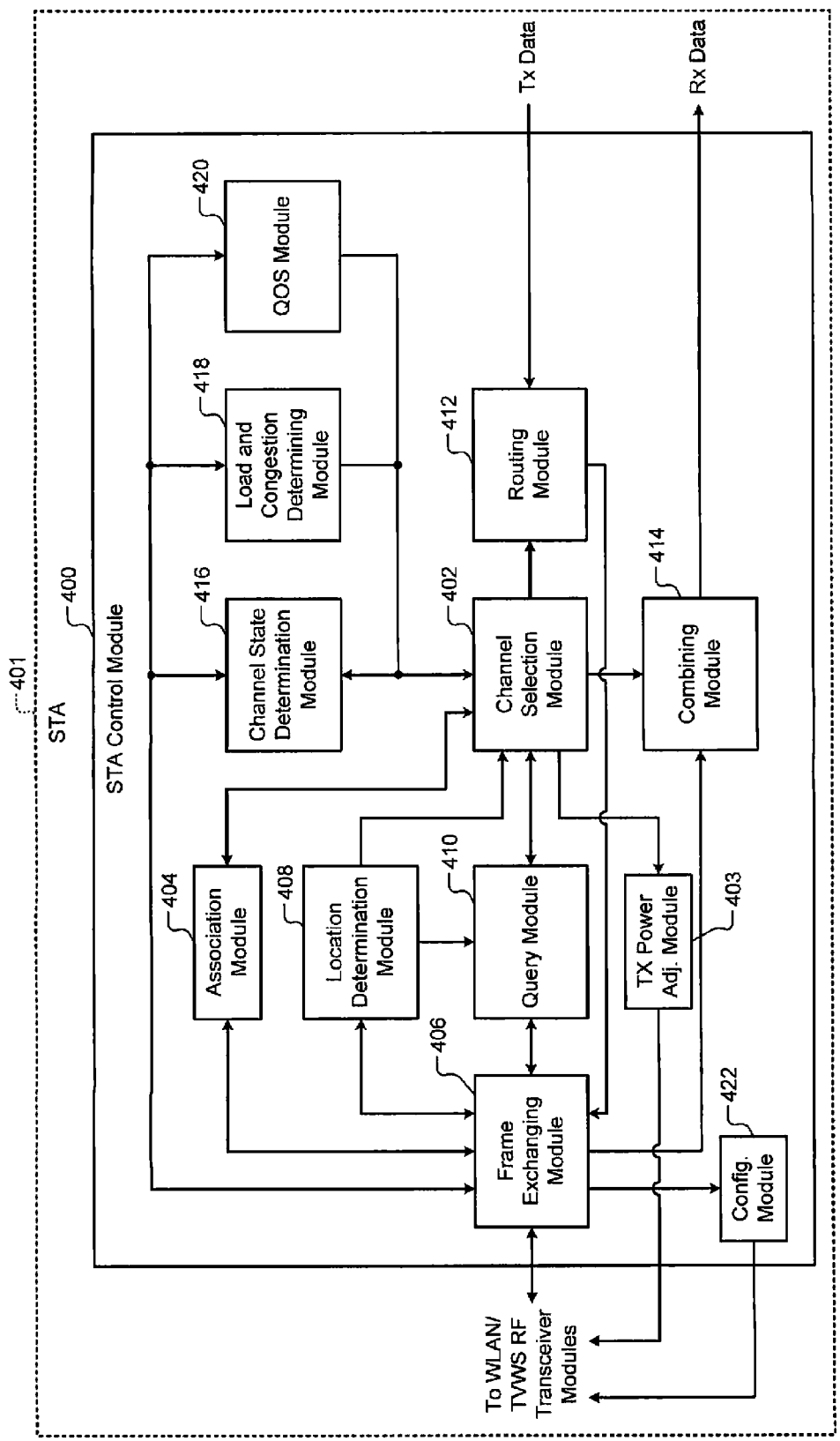
FIG. 6 is functional block diagram of a client station (STA) control module.

Referring now to FIG. 6, a STA control module 400 that can be implemented in a STA 401 is shown. For example, the STA control module 400 can be implemented in the STA 12 shown FIG. 1C or the STA 102 shown in FIG. 2. Additionally, the STA control module 400 can be implemented in the WLAN devices 150, 200, 250 of FIGS. 3A-3C when the WLAN devices 150, 200, 250 operate as STAs. The STA control module 400 performs functions of one or more modules of the STA 12, the STA 102, and the WLAN devices 150, 200, 250. Accordingly, the STA control module 400 may be implemented in one or more modules of the STA 12, the STA 102, and the WLAN devices 150, 200, 250.

The STA control module 400 includes a channel selection module 402, a transmit power adjustment module 403, an association module 404, a frame exchanging module 406, a location determination module 408, a query module 410, a routing module 412, and a combining module 414. Additionally, the STA control module 400 includes a channel state determination module 416, a load and congestion determining module 418, a QOS module 420, and a configuration module 422.

The channel selection module 402 selects a WLAN channel and/or a TVWS channel for communicating with an AP. For example, the channel selection module 402 may initially select a WLAN channel to communicate with the AP. Alternatively or additionally, depending on information received from the AP about availability of a TVWS channel, the channel selection module 402 may select a TVWS channel to communicate with the AP. For example, channel selection module 402 may select a TVWS channel based on information received from the AP via beacons in the format shown in FIG. 4A. Depending on the channel or channels selected, the association module 404 may associate with the AP on the WLAN channel and/or the TVWS channel.

Occasionally, depending on the criteria described above with reference to FIGS. 2-3C, the channel selection module 402 may select both the WLAN channel and the TVWS channel for concurrent use. For example, both channels may be selected when the STA 401 is proximate to the AP while only the TVWS channel may be selected when the STA 401 is far from the AP.

Additionally, the channel selection module 402 may switch between the WLAN channel and the TVWS channel. For example, when the STA 401 is roaming, the channel selection module 402 may switch between the WLAN channel and the TVWS channel based on a distance between the STA 401 and the AP. For example, the channel selection module 402 may select the WLAN channel when the distance of the STA 401 from the AP is less than or equal to a predetermined distance. Conversely, the channel selection module 402 may select the TVWS channel when the distance of the STA 401 from the AP is greater than or equal to a predetermined distance.

The frame exchanging module 406 communicates with WLAN components and/or TVWS components of the STA

401 depending on the channel or channels selected. The WLAN components of the STA 401 include a WLAN MAC module, a WLAN PHY module, and a WLAN RF transceiver module of the STA 401 (not shown) that are similar to corresponding modules shown in FIGS. 3A-3C. The TVWS components of the STA 401 include a TVWS MAC module, a TVWS PHY module, and the TVWS RF transceiver module of the STA 401 (not shown) that are similar to corresponding modules shown in FIGS. 3A-3C. The frame exchanging module 406 transmits/receives frames (or packets of data) to/from the AP via the WLAN RF transceiver module and/or the TVWS RF transceiver module of the STA 401, which are similar to corresponding modules shown in FIGS. 3A-3C.

The routing module 412 routs data to be transmitted from the STA 401 to the WLAN components and/or the TVWS components of the STA 401 based on the channel or channels selected. When both the WLAN channel and TVWS channel are used concurrently, the routing module 412 routes a first portion of the transmit data (Tx data) to the WLAN components of the STA 401. The routing module routes a second portion of the Tx data to the TVWS components of the STA 401. The WLAN components and the TVWS components of the STA 401 transmit the first and second portions of the Tx data to the AP via respective RF transceiver modules of the STA 401.

Additionally, when both the WLAN channel and the TVWS channel are used concurrently, the WLAN components and the TVWS components of the STA 401 receive first and second portions of the receive data (Rx data) from the AP via respective RF transceiver modules of the STA 401. The combining module 414 receives the first and second portions of the Rx data from the frame exchanging module 406. The combining module 414 combines the first and second portions of the Rx data received from the frame exchanging module 406 and outputs the combined receive data to processing modules (not shown) of the STA 401 for further processing.

The location determination module 408 determines the location of the STA 401 as described above with reference to FIGS. 2-3C. The location determination module 408 may transmit the location of the STA 401 to the AP. The STA 401 may receive information from the AP about TVWS channels available where the STA 401 is located. Alternatively, the query module 410 may obtain the information by querying the database 14 directly or via the AP as described above with reference to FIGS. 2-3C.

The association module 404 may transmit the information obtained from the database 14 to the AP via association frames. For example, the association frames may include the information in the format shown in FIG. 4B. The AP, in turn, may use the information to determine capabilities of the STA 401.

Based on the information received from the database 14 or the AP, the channel selection module 402 may select a TVWS channel, and the association module 404 may associate the STA 401 with the AP via the TVWS channel. The transmit power adjustment module 403 may adjust the transmit power of the TVWS RF transceiver module of the STA 401 according to the maximum transmit power information received from the AP or the database 14. For example, the transmit power adjustment module 403 may adjust the transmit power of the TVWS RF transceiver module to less than or equal to the maximum transmit power.

Additionally, the location determination module 408 may determine the distance of the STA 401 from the AP and outputs the distance to the channel selection module 402. The channel state determination module 416 analyses the frames being transmitted and received by the frame exchanging module 406. Based on the analysis, the channel state determination module 416 determines the state of the channel used (e.g., signal strength, error rate, etc. on the WLAN/TVWS channels) and outputs the state to the channel selection module 402.

The load and congestion determining module 418 determines the load on the AP and the congestion at the AP by monitoring frames transmitted and received by the frame exchanging module 406. The QOS module 420 determines the QOS requirement of the STA 401. The channel selection module 402 selects the WLAN and/or TVWS channels according to inputs received from the location determination module 408, the channel state determination module 416, the load and congestion determining module 418, and/or the QOS module 420. For example, based on the inputs received, the channel selection module 402 determines when to use the WLAN channel and the TVWS channel concurrently.

The configuration module 422 receives the configuration information transmitted by the AP 301 when the AP 301 selects multicast transmissions. The configuration module 422 receives the configuration information via information elements in the beacon frames or other frames. For example, the configuration information may be received via the information elements that include the TVWS parameter set. The configuration module 422 receives the beacon frames or the other frames via the frame exchanging module 406.

On receiving the configuration information, the configuration module 422 disables the transmit portions of the TVWS components of the STA 401 and configures the STA 401 to receive mode. Disabling a module or its portions may include a complete shut down (e.g., turning off power supply and/or clocks) of the module. Alternatively, disabling may include setting the module or its portions to a low power mode. For example, the configuration module 422 may shut down or set to a low power mode the transmit portion of the TVWS RF transceiver module of the STA 401. Accordingly, the STA 401 may be able to only receive but not transmit data via the TVWS channel.

When the AP 301 stops the multicast transmissions, the AP 301 may transmit configuration information that enables the STA 401 to transmit data in the TVWS channel. On receiving the configuration information, the configuration module 422 enables the transmit portions of the TVWS components of the STA 401. Enabling a module or its portions may include turning on power supply and/or clocks for the module. Alternatively, enabling may include setting the module or its portions to a full power mode. Accordingly, the STA 401 may be able to transmit and receive data via the TVWS channel.

Figure 7:
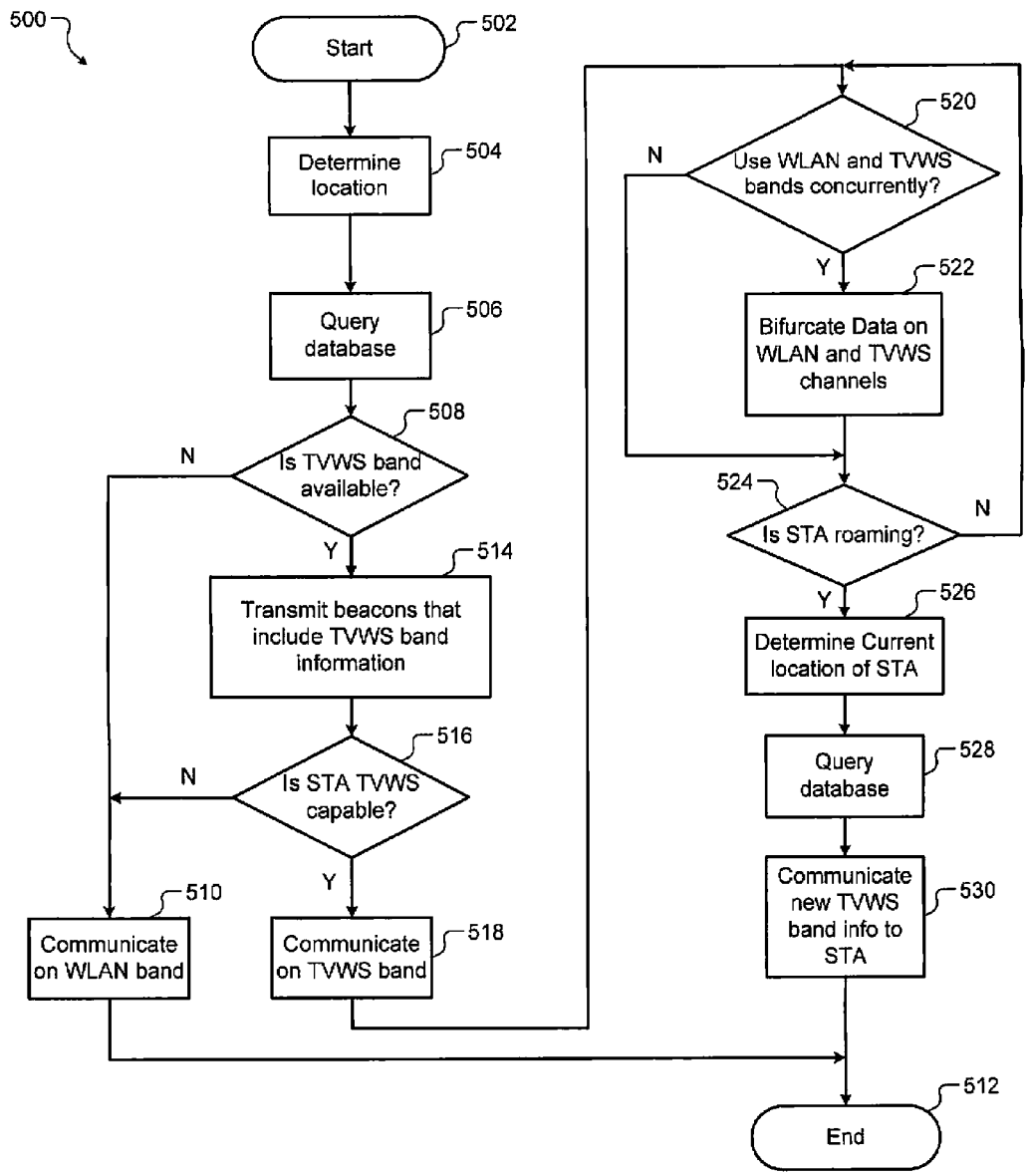
FIG. 7 is flowchart of a method for communicating on television whitespace (TVWS) channels.

Referring now to FIG. 7, a method 500 for communicating on TVWS channels is shown. Control begins at 502. Control determines the location of an AP at 504. At 506, control queries a remote database including information of TVWS channels that may be available for unlicensed use at the location of the AP. At 508, control determines if a TVWS channel is available for unlicensed use at the location of the AP. At 510, if a TVWS channel is unavailable, control communicates on the WLAN channels, and control ends at 512.

If, however, a TVWS channel is available, control transmits beacons at 514. The beacons include information of the TVWS channel and the maximum transmit power that can be used when communicating on the TVWS channel. At 516, control determines if a STA can communicate on the TVWS channel. At 510, control communicates with the STA on the WLAN channels if the STA cannot communicate on the TVWS channel. At 518, if a STA can communicate on the TVWS channel, control communicates with the STA on the TVWS channel.

At 520, control determines whether to use the WLAN channel and the TVWS channel concurrently. Control may determine whether to use the WLAN channel and the TVWS channel concurrently based on distance between the AP and the STA, load on the AP, channel conditions in the WLAN and TVWS channels, congestion, and/or QOS requirements of the STA. At 522, control may bifurcate data on the WLAN channel and the TVWS channel if the WLAN channel and the TVWS channel are used concurrently.

At 524, control determines if the STA is roaming. Control returns to 520 if the STA is not roaming. If the STA is roaming, however, control determines the current location of the STA at 526. At 528, control queries the database to determine if a new TVWS channel is available at the current location of the STA. At 530, control communicates the information of the new TVWS channel and associated transmit power to the STA, if any. Control ends at 512.

Figure 8:
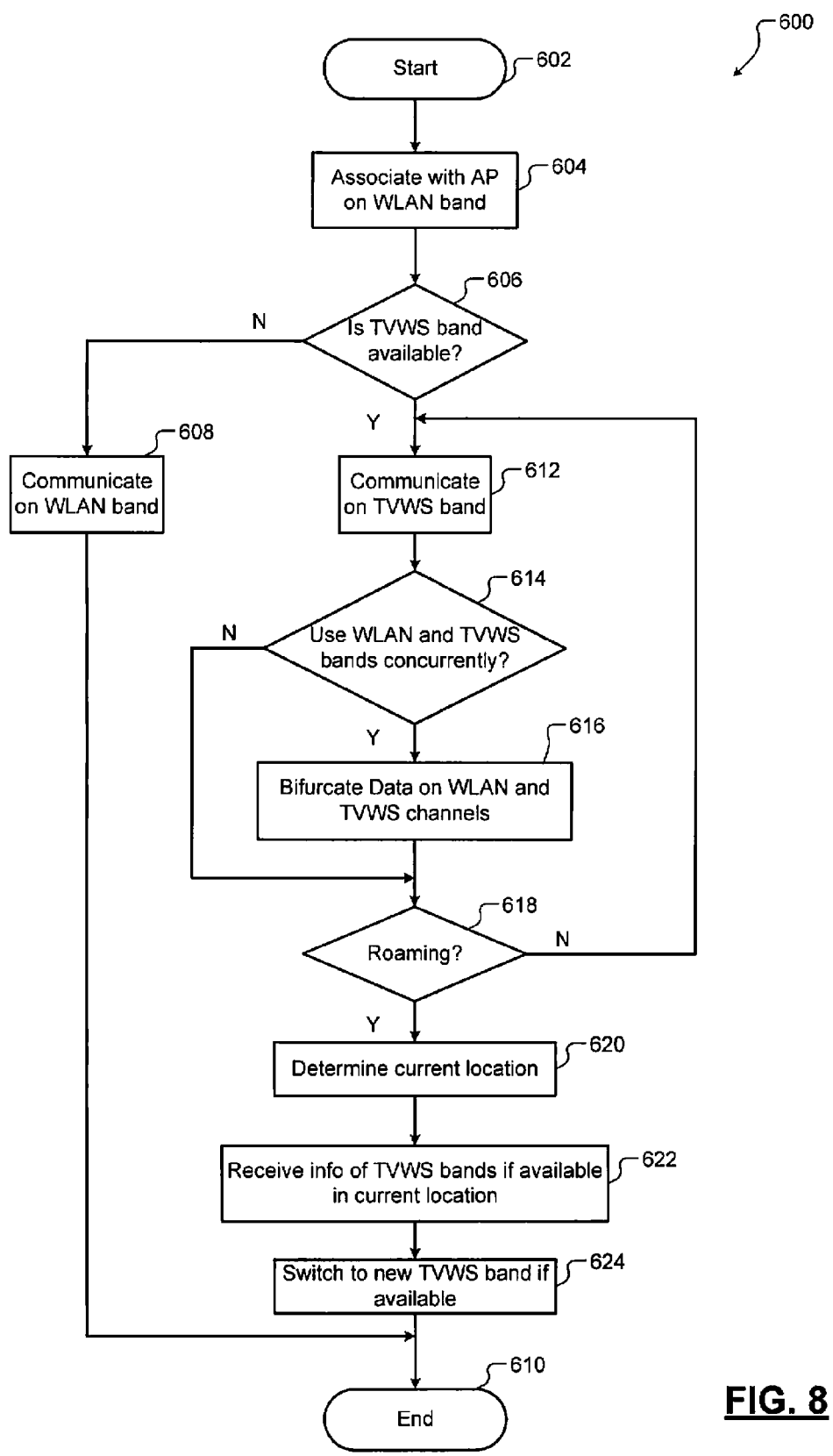
FIG. 8 is flowchart of a method for communicating on television whitespace (TVWS) channels.

Referring now to FIG. 8, a method 600 for communicating on TVWS channels is shown. Control begins at 602. Control associates a STA with an AP at 604 on a WLAN channel. At 606, control determines if a TVWS channel is available for communicating with the AP. Control may derive the information by directly querying a remote database, by accessing a list of available TVWS channels stored in the AP, or from beacons received from the AP.

If a TVWS channel is not available, control communicates with the AP using the WLAN channels at 608, and control ends at 610. If, however, a TVWS channel is available, control communicates with the AP on the TVWS channel at 612.

At 614, control determines whether to use WLAN and TVWS channels concurrently. Control may determine whether to use WLAN and TVWS channels concurrently based on load on the AP, channel conditions in the WLAN and TVWS channels, congestion, and/or QOS requirements of the STA. At 616, control may bifurcate data on WLAN and TVWS channels if the WLAN and TVWS channels are used concurrently.

At 618, control determines if the STA is roaming. Control returns to 612 if the STA is not roaming. If the STA is roaming, however, control determines the current location of the STA at 620. At 622, control receives information whether a new TVWS channel is available at the current location of the STA and transmit power requirement associated with the new TVWS channel. Control may receive the information directly from the database or from the AP. At 624, control adjusts transmit if necessary and switches to the new TVWS channel if available. Control ends at 626.

The teachings of the present disclosure have many applications. For example, the teachings may be used to increase range of hotspots, where client stations may roam away from the hotspots and yet maintain connection to the hotspot by switching from WLAN channels to TVWS channels. Additionally, the teachings may be used in home networks. For example, a client station (e.g., a cellular phone, a laptop, etc.) may connect to a WLAN in a home via the WLAN channels while the client station is inside the home. The client station may connect to the WLAN via a TVWS channel when the client station is roaming outside the home (e.g., in the yard).

In other applications, a home WLAN may include a plurality of TV's, where only one TV includes a TV receiver while other TV's do not include TV receivers. The TV with the TV receiver may be configured as an AP, and the other TV's may be configured as STAs. The TV configured as AP receives programming from a TV station via the TV receiver and distributes the programming to the other TV's via the WLAN. Additional applications are contemplated.

While the present disclosure refers to TV White Space, the TV White Space is only a portion of electromagnetic spectrum regulated by the FCC. Accordingly, a TV White Space channel is used in the present disclosure only as an example of a channel that is not assigned for licensed use in a regulated frequency spectrum and that is available for use by unlicensed communication devices. The teachings of the present disclosure are applicable to any regulated frequency spectrum that has channels available for use by unlicensed communication devices. Additionally, the teachings of the present disclosure are applicable to frequency spectra regulated in different countries.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A client station comprising:
a transceiver module configured to receive a beacon from an access point, wherein the beacon includes information of a first available channel that is not assigned for licensed use in a regulated frequency spectrum and that is available for use at a location of the access point, wherein the first available channel is a television white space channel;
an association module configured to
associate the client station with the access point via the first available channel in response to the client station being within range of the location of the access point,
associate the client station with the access point via the first available channel in response to a distance of the client station from the location of the access point being greater than or equal to a predetermined distance, and
associate the client station with the access point via a channel in a 2.4 GHz band or a 5 GHz band in response to the distance of the client station from the location of the access point being less than the predetermined distance;
a channel selection module configured to switch a connection of the client station to the access point between (i) the channel in the 2.4 GHz band or the 5 GHz band and (ii) the first available channel based on (a) the distance of the client station from the location of the access point, (b) a state of the connection, and (c) a quality of service requirement of the client station; and
a convergence module configured to
select (i) a first type of data for transmission through the first available channel and (i) a second type of data for transmission through the channel in the 2.4 GHz band or the 5 GHz band,
route the first type of data to be transmitted from the client station to the access point through the first available channel,
route the second type of data to be transmitted from the client station to the access point through the channel in the 2.4 GHz band or the 5 GHz band, and
combine (i) data received by the client station through the first available channel with (ii) data received by the client station through the channel in the 2.4 GHz band or the 5 GHz band.

2. The client station of claim 1, wherein:
the beacon specifies a maximum transmit power for use by the client station while the client station communicates with the access point via the first available channel; and
the client station further comprises a power adjustment module configured to adjust a transmit power of the client station to less than or equal to the maximum transmit power while the client station communicates with the access point via the first available channel.

3. The client station of claim 1, further comprising:
a query module configured to
query a database or the access point, and
in response to the query, receive information about a second available channel that is not assigned for licensed use in the regulated frequency spectrum and that is available at a location of the client station; and
a roaming module configured to switch the connection of the client station to the second available channel in response to the client station roaming out of the range of the access point.

4. The client station of claim 3, wherein the second available channel is a television white space channel.

5. The client station of claim 1, wherein:
the transceiver module is a first transceiver module configured to communicate with the access point via the channel in the 2.4 GHz band or the 5 GHz band; and
the client station further comprises
a second transceiver module configured to communicate with the access point via the first available channel,
a first antenna associated with the first transceiver module, and
a second antenna associated with the second transceiver module.

6. The client station of claim 5, further comprising:
a physical layer module configured to communicate with each of the first transceiver module and the second transceiver module; and
a media access control module configured to communicate with the physical layer module,
wherein the physical layer module and the media access control module are configured to communicate via the first available channel, the 2.4 GHz band, and the 5 GHz band.

7. An access point comprising:
a query module configured to
query a remote database, and
in response to the query, receive information comprising a first available channel that is not assigned for licensed use in a regulated frequency spectrum and that is available for use at a location of the access point, wherein the first available channel is a television white space channel; and
a beacon generation module configured to generate a beacon that includes the information;
a transceiver module configured to transmit the beacon to a client station within range of the location of the access point;
a channel selection module configured to switch a connection of the access point to the client station between (i) a channel in a 2.4 GHz band or a 5 GHz band and (ii) the first available channel based on (a) a distance of the client station from the location of the access point, (b) a state of the connection, and (c) a quality of service requirement of the client station; and a convergence module configured to
select (i) a first type of data for transmission through the first available channel and (i) a second type of data for transmission through the channel in the 2.4 GHz band or the 5 GHz band,
route the first type of data to be transmitted from the access point to the client station through the first available channel,
route the second type of data to be transmitted from the access point to the client station through the channel in the 2.4 GHz band or the 5 GHz band, and
combine (i) data received by the access point from the client station through the first available channel with (ii) data received by the access point from the client station through the channel in the 2.4 GHz band or the 5 GHz band,
wherein the client station is configured to
associate the client station with the access point via the first available channel in response to the distance of the client station from the location of the access point being greater than or equal to a predetermined distance, and
associate with the access point via the channel in the 2.4 GHz band or the 5 GHz band in response to the distance of the client station from the location of the access point being less than the predetermined distance.

8. The access point of claim 7, wherein the information further specifies a maximum transmit power for use by the client station while communicating via the first available channel.

9. The access point of claim 7, further comprising a location determination module configured to determine a location of the client station based on (i) the location of the access point and (ii) the distance of the client station from the access point.

10. The access point of claim 9, wherein:
the query module is configured to query the remote database and receive information about a second available channel that is not assigned for licensed use in the regulated frequency spectrum and that is available for use at the location of the client station; and
the transceiver module is configured to transmit the information about the second available channel to the client station.

11. The access point of claim 10, wherein the second available channel is a television white space channel.

12. The access point of claim 7, wherein the transceiver module further comprises:
a first transmitter module and a first receiver module configured to communicate with the client station via the channel in the 2.4 GHz band or the 5 GHz band;
a second transmitter module and a second receiver module configured to communicate with the client station via the first available channel;
a first antenna associated with the first transmitter module and the first receiver module; and
a second antenna associated with the second transmitter module and the second receiver module.

13. The access point of claim 12, further comprising:
a physical layer module configured to communicate with the first transmitter module, the first receiver module, the second transmitter module, and the second receiver module; and
a media access control module configured to communicate with the physical layer module, wherein the physical layer module and the media access control module are configured to communicate via the first available channel, the 2.4 GHz band, and the 5 GHz band.

14. The access point of claim 12, further comprising:
a first physical layer module configured to communicate with the first transmitter module and the first receiver module;
a second physical layer module configured to communicate with the second transmitter module and the second receiver module;
a first media access control module configured to communicate with the first physical layer module; and
a second media access control module configured to communicate with the second physical layer module,
wherein the first physical layer module, the second physical layer module, the first media access control module, and the second media access control module are configured to communicate via the first available channel, the 2.4 GHz band, and the 5 GHz band.

* * * * *